United States Patent
Meoded et al.

(10) Patent No.: US 9,374,617 B2
(45) Date of Patent: Jun. 21, 2016

(54) SYSTEM AND METHOD FOR THE PRESENTATION OF ALTERNATIVE CONTENT TO VIEWERS VIDEO CONTENT

(75) Inventors: Yaniv Meoded, Kfar Saba (IL); Daniel Slutsky, Petach Tiqwa (IL); Asaf Rubin, Moshav Herev Le'et (IL)

(73) Assignee: TABOOLA.COM LTD, Tel Aviv (IL)

( * ) Notice: Subject to any disclaimer, the term of this patent is extended or adjusted under 35 U.S.C. 154(b) by 775 days.

(21) Appl. No.: 13/127,052

(22) PCT Filed: Oct. 29, 2009

(86) PCT No.: PCT/IL2009/001010
§ 371 (c)(1),
(2), (4) Date: Jul. 21, 2011

(87) PCT Pub. No.: WO2010/049932
PCT Pub. Date: May 6, 2010

(65) Prior Publication Data
US 2011/0282745 A1 Nov. 17, 2011

Related U.S. Application Data

(60) Provisional application No. 61/193,126, filed on Oct. 30, 2008.

(51) Int. Cl.
*H04N 21/442* (2011.01)
*H04N 21/2668* (2011.01)
(Continued)

(52) U.S. Cl.
CPC ..... *H04N 21/44222* (2013.01); *G06Q 30/0264* (2013.01); *H04H 60/33* (2013.01);
(Continued)

(58) Field of Classification Search
CPC .................. H04N 21/2668; H04N 21/44218; H04N 21/44222; H04N 21/44213; H04N 7/163
See application file for complete search history.

(56) References Cited

U.S. PATENT DOCUMENTS 7,644,427 B1 * 1/2010 Horvitz et al. .................. 725/46
2005/0071865 A1 3/2005 Martins
(Continued)

FOREIGN PATENT DOCUMENTS

WO 2008/047363 A2 4/2008

OTHER PUBLICATIONS

International Preliminary Report on Patentability dated Apr. 14, 2011 in corresponding international application No. PCT/IL2009/001010.
(Continued)

*Primary Examiner* — Ricky Chin
(74) *Attorney, Agent, or Firm* — Browdy and Neimark, PLLC

(57) ABSTRACT

According to certain embodiments of the present invention behavioral patterns are utilized in order to calculate a predicted level of interest of viewers in a specific video item at any given moment throughout the length of the video item. More specifically, according to certain embodiments, this calculation allows to identify instances of peaks of high and low interest throughout the length of the video item. This allows predicting the occurrence of critical moments throughout the video item when it is likely that viewers would abandon the video item on one hand, and moments when viewers are most likely absorbed in the currently presented video, on the other hand. This information allows to capture viewers when their interest in the viewed content is low or decreasing, and to synchronize the presentation of alternative content to these instances.

25 Claims, 3 Drawing Sheets

(51) Int. Cl.
*H04N 7/16* (2011.01)
*G06Q 30/02* (2012.01)
*H04H 60/33* (2008.01)
*H04H 60/65* (2008.01)
*H04N 21/25* (2011.01)
*H04N 21/482* (2011.01)
*H04N 21/81* (2011.01)

(52) U.S. Cl.
CPC .............. *H04H 60/65* (2013.01); *H04N 7/163* (2013.01); *H04N 21/252* (2013.01); *H04N 21/44213* (2013.01); *H04N 21/4826* (2013.01); *H04N 21/812* (2013.01)

(56) References Cited

U.S. PATENT DOCUMENTS

| | | | |
|---|---|---|---|
| 2005/0076365 A1* | 4/2005 | Popov et al. | 725/46 |
| 2005/0198661 A1 | 9/2005 | Collins et al. | |
| 2007/0089125 A1 | 4/2007 | Claassen | |
| 2008/0046923 A1 | 2/2008 | Enderwick | |
| 2008/0092168 A1* | 4/2008 | Logan et al. | 725/44 |
| 2008/0163305 A1* | 7/2008 | Johnson et al. | 725/58 |
| 2009/0106786 A1* | 4/2009 | Mori et al. | 725/9 |
| 2010/0107195 A1* | 4/2010 | Hsu et al. | 725/44 |
| 2010/0153986 A1* | 6/2010 | Ellis | 725/28 |
| 2012/0011530 A1* | 1/2012 | Bentolila et al. | 725/14 |

OTHER PUBLICATIONS

Vilas et al., "User Behaviour Analysis of a Video-On-Demand Service with a Wide Variety of Subjects and Lengths" Software Engineering and Advanced Applications, 31st Euromicro Conference on IEEE (2005).

\* cited by examiner

SYSTEM AND METHOD FOR THE PRESENTATION OF ALTERNATIVE CONTENT TO VIEWERS VIDEO CONTENT

FIELD OF THE INVENTION

The present invention is related to the field of behavioral pattern analysis.

BACKGROUND OF THE INVENTION

With improvement to broadband network infrastructure and the increase in user generated content, it is common for websites to use the display of video content as a platform for exposing viewers to commercial advertisements. Great efforts are made in order to increase the exposure of Internet users to advertisements. Website's administrators attempt to maintain website viewers constantly interested and thus to extend the period of time they are viewing the video content and advertisements provided by the website. In order to continuously capture the interest of viewers, websites may provide viewers with other video items which are related to the viewed video item.

The presentation of related video content or advertisements is done before, after or during the time a video is being watched. However, it is often the case that viewers do not watch the full length of the video and thus, where the related content is displayed at the end of the video, their exposure to the advertisements or the related content is considerably decreased. On the other hand, presenting related content and advertisements to viewers while they are watching the video is likely to interfere with the video item and irritate viewers, causing them to either absentmindedly or deliberately ignore the presented content.

Therefore there is a need in the art for a system and method designed for displaying content to users in an intelligent manner in order to overcome the above disadvantages.

GENERAL DESCRIPTION

According to a first aspect of the invention there is provided a computer implemented method of presenting an alternative content with the help of a system for analyzing a video item and comprising a data collecting unit operatively coupled to a processing unit and a data repository, the video item being presented by a video presenting application, the application being configured to enable a plurality of viewers of the video item to generate user-generated events, the method comprising:

(a) receiving from one or more viewers among the plurality of viewers information indicative of a plurality of respective user generated events, the receiving being performed with the help of the data collection unit;

(b) processing the received information with the help of the processing unit, wherein the processing comprising:
 i) identifying from among the plurality of user-generated events a second plurality of user-generated events indicative of a change in the interest of the one or more viewers in the video item;
 ii) identifying one or more time intervals of a predefined length throughout the length of the video item, when the second plurality of identified user-generated events occurred;
 iii) based on at least the identified intervals, generating a video profile of the video item, the video profile being indicative of at least one time interval which is characterized by a change in the interest of viewers in respect of the video item; and (c) storing the video profile in the data repository.

According to certain embodiments, the method further comprises the following stages:

(d) utilizing at least the video profile for determining at least one time interval, throughout the length of the video item characterized by a likelihood for a change in the interest of a current viewer in the video item; and (e) enabling synchronization of a time of presenting alternative content to the current viewer within close proximity to the at least one determined time interval.

According to a second aspect of the invention there is provided a system for analyzing a video item, the system being operative to receive one or more user-generated events obtained by a video presenting application adapted to enable a plurality of viewers of the video item to generate user-generated events the system comprising:

a data collection unit configured for receiving information indicative of a plurality of user generated events, generated by the plurality of viewers of the video item a processing unit configured to perform at least the following:

(a) identifying from among the plurality of user-generated events, a second plurality of user generated events indicative of a change in the interest of the plurality viewers in the video item;

(b) identifying one or more time intervals throughout the length of the video item, when the second plurality of identified user generated events occurred;

(c) based on at least the one or more time intervals generating a video profile of the video item, the video profile being indicative of at least one or more time intervals which are characterized by a change in the interest of viewers in respect of the video item.

According to a third aspect of the invention there is provided a computer implemented program storage device readable by machine, tangibly embodying a program of instructions executable by the machine to perform method steps of presenting an alternative content with the help of a system for analyzing a video item and comprising a data collecting unit operatively coupled to a processing unit and a data repository, the video item being presented by a video presenting application, the application being configured to enable a plurality of viewers of the video item to generate user-generated events, the method comprising:

(a) receiving from one or more viewers among the plurality of viewers information indicative of a plurality of respective user generated events, the receiving being performed with the help of the data collection unit;

(b) processing the received information with the help of the processing unit, wherein the processing comprising:
 i) identifying from among the plurality of user-generated events a second plurality of user-generated events indicative of a change in the interest of the one or more viewers in the video item;
 ii) identifying one or more time intervals of a predefined length throughout the length of the video item, when the second plurality of identified user-generated events occurred;
 iii) based on at least the identified intervals, generating a video profile of the video item, the video profile being indicative of at least one time interval which is characterized by a change in the interest of viewers in respect of the video item; and (c) storing the video profile in the data repository.

According to fourth aspect of the invention there is provided a computer implemented computer program product comprising a computer useable medium having computer readable program code embodied therein of presenting an alternative content with the help of a system for analyzing a video item and comprising a data collecting unit operatively coupled to a processing unit and a data repository, the video item being presented by a video presenting application, the application being configured to enable a plurality of viewers of the video item to generate user-generated events, the computer program product comprising:

computer readable program code for causing the computer to receive from one or more viewers among the plurality of viewers information indicative of a plurality of respective user generated events, the receiving being performed with the help of the data collection unit;

computer readable program code for causing the computer to process the received information with the help of the processing unit, wherein the processing comprising:
computer readable program code for causing the computer to identifying from among the plurality of user-generated events a second plurality of user-generated events indicative of a change in the interest of the one or more viewers in the video item;

computer readable program code for causing the computer to identifying one or more time intervals of a predefined length throughout the length of the video item, when the second plurality of identified user-generated events occurred;

computer readable program code for causing the computer to based on at least the identified intervals, generating a video profile of the video item, the video profile being indicative of at least one time interval which is characterized by a change in the interest of viewers in respect of the video item; and computer readable program code for causing the computer to store the video profile in the data repository.

BRIEF DESCRIPTION OF THE DRAWINGS

In order to understand the invention and to see how it may be carried out in practice, certain embodiments will now be described, by way of non-limiting example only, with reference to the accompanying drawings, in which.

DETAILED DESCRIPTION OF EMBODIMENTS OF THE INVENTION

Figure 1:
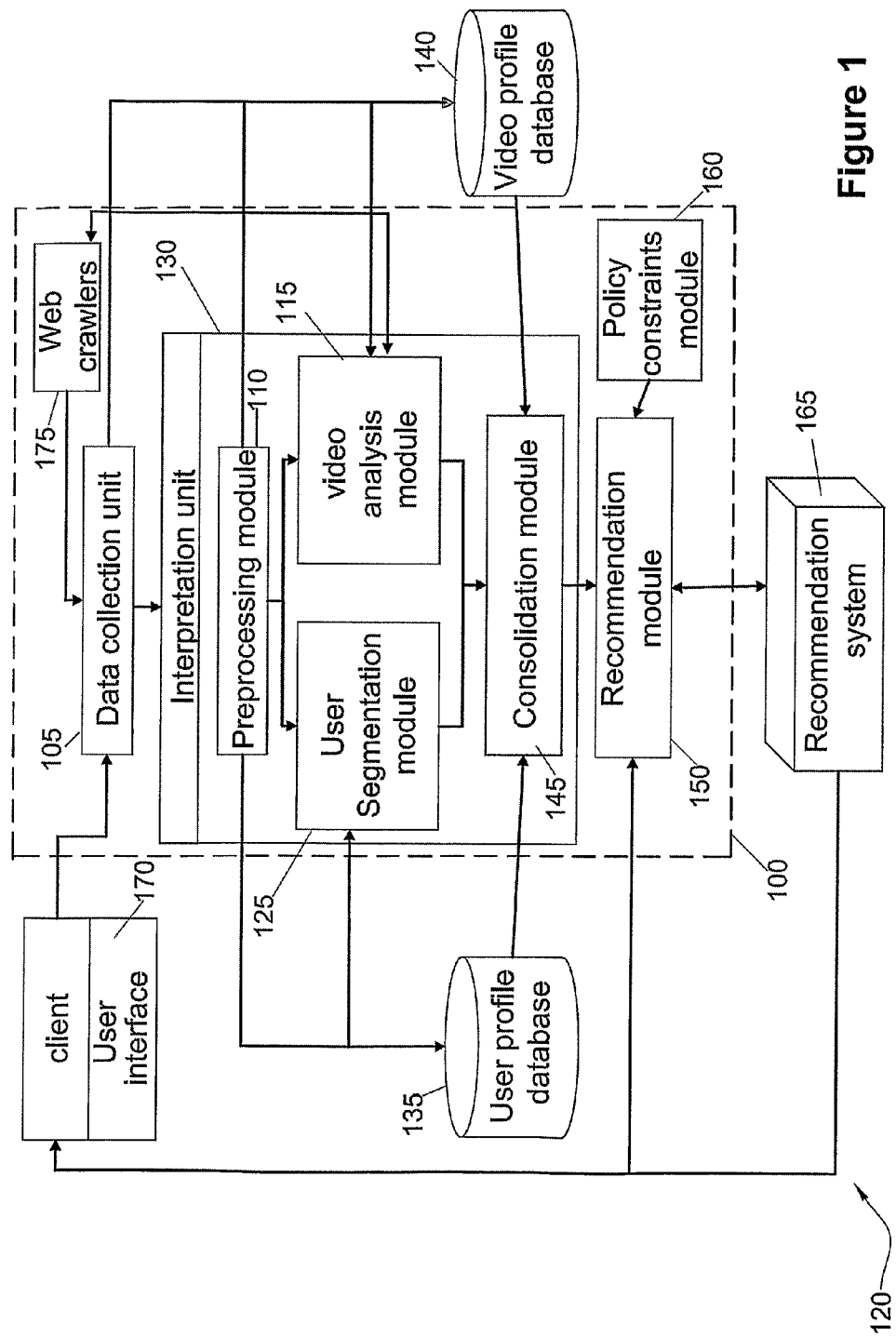
FIG. 1 illustrates a generalized scheme of the system architecture 100 in a context of a network 120, in accordance with an embodiment of the invention.

As used herein, the phrase "for example," "such as", "for instance" and variants thereof describe non-limiting embodiments of the present invention.

Reference in the specification to "one embodiment", "an embodiment", "some embodiments", "another embodiment", "other embodiments" "certain embodiments", "one case", "some cases", "other cases" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments", "one case", "some cases", "other cases", or variations thereof does not necessarily refer to the same embodiment(s).

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Some embodiments of the present invention are primarily disclosed as a method and it will be understood by a person of ordinary skill in the art that an apparatus such as a conventional data processor incorporated with a database, software and other appropriate components may be programmed or otherwise designed to facilitate the practice of the method of the invention.

Unless specifically stated otherwise, as apparent from the following discussions, it is appreciated that throughout the specification discussions, utilizing terms such as, "providing", "generating", "processing", "taking", "selecting", "receiving", "analyzing", "enhancing", or the like, refer to the action and/or processes of any combination of software, hardware and/or firmware. The term "computer" should be expansively construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices and combinations thereof.

Embodiments of the present invention may use terms such as unit, service, module, tool, technique, system, processor, device, tool, computer, apparatus, element, server, engine, etc, (in single or plural form) for performing the operations herein. These terms, as appropriate, refer to any combination of software, hardware and/or firmware configured to perform the operations as defined and explained herein. The module(s) (or counterpart terms specified above may be specially constructed for the desired purposes, or it may comprise a general purpose computer selectively activated or reconfigured by a program stored in the computer. Such a program may be stored in a readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed, for example via a computer system bus.

In addition, embodiments of the present invention are not described with reference to any particular programming language. It will be appreciated that a variety of programming languages may be used to implement the teachings of the inventions as described herein.

It should be noted that the division of the system into the specific modules and/or units as shown in FIG. 1, is only for ease of understanding and in other embodiments any of the modules may be separated into a plurality of modules or alternatively combined with any other module(s). In some embodiments, the system depicted in FIG. 1 includes less, more or different modules and/or units than shown in FIG. 1. Each of the modules of the system may be made up of any combination of software, hardware and/or firmware capable of performing the functions described and defined herein. In other embodiments of the invention any module of the system may provide less functionality, more functionality and/or different functionality than the functionality provided by the modules illustrated in FIG. 1. In some embodiments, part of the functionalities as described with reference to the system may be implemented in the client 170.

Unless defined otherwise, all technical and scientific terms used herein have the same meaning as commonly understood by one of ordinary skill in the art to which this invention belongs. Generally (although not necessarily), the nomenclature used herein described below is well known and commonly employed in the art. Unless described otherwise, conventional methods are used, such as those provided in the art and various general references.

The following is a list of terms and their definitions as used in the context of the present invention:

1. The terms "user" or "viewer" may be used interchangeably, and refer to a user of an application for presenting video content such as for example, a web browser displaying video content presenting website (e.g. YouTube).

2. The terms "video content" or "video item" as used herein refer to any type of video and may include, for example short video streams (e.g. video clips) and long video streams (e.g. full length movies).

3. The term "current viewer" as used herein refers to a user who is currently connected to the system of the present invention.

4. The term, "user generated event" (or "viewer action") as used herein refers to an action performed by a viewer while interacting with an application for presenting video content. Examples of user generated events are: requesting alternative content while watching a video item, selecting a different video item from a menu of proposed video items and watching the selected video item, abandoning an application (e.g. turning to a different webpage or closing a web browser), stopping the video, pausing the video, hovering with the mouse over the application, scrolling down a scroll bar, replaying a video item etc. User generated events may also include actions which are initiated automatically by an application in response to another action performed by the viewer, for example, a request for alternative content which is issued by an application in response to a viewer starting to watch a new video.

5. The term "behavioral pattern" as used herein, refers to one or more user generated events, which are performed in sequence by a certain user (e.g. a specific pattern of actions performed by a user). Behavioral patterns may include any action (i.e. any user generated event) which is performed by viewers, via an interface of a video content presenting application before, after or while watching a video item.

6. The term "session" as used herein refers to a sequence of one or more web pages viewed by the same viewer.

7. The term "alternative content" as used herein refers to any digital content that may be suggested or presented to a user of a video presenting application. Alternative content includes, for example, alternative video items, advertisements, links to other websites etc.

8. The term "video view" as used herein refers to the action of viewing a video item.

According to certain embodiments of the present invention, a method and system is disclosed, for analyzing behavioral patterns of viewers of video content and deducing therefrom characteristics and qualities of the video content. Behavioral patterns of viewers of video content (or video items) may often mirror the impression of the viewer on the viewed video item. It is therefore possible by studying and analyzing behavioral patterns of viewers to obtain information regarding the video item. The information that can be realized from behavioral patterns may include for example, the rating of a video item among viewers (e.g. the popularity of a video among viewers), the quality of the video item, the quality of the server broadcasting the video item and more.

According to certain embodiment of the present invention, behavioral patterns are utilized in order to calculate a predicted level of interest of viewers in a specific video item at any given moment throughout the length of the video item. More specifically, according to certain embodiments, one goal of this calculation is to identify instances of peaks of high and low interest throughout the length of the video item. This allows predicting the occurrence of critical moments throughout the video item when it is likely that viewers would abandon the video item on one hand, and moments when viewers are most likely to be absorbed in the currently presented video, on the other hand. This information allows to capture viewers when their interest in the viewed content is low or decreasing, and to synchronize the presentation of alternative content to these instances.

Suggesting alternative content to viewers while they are less interested in the video item may serve to increase the ability of publishers (e.g. websites) to draw the viewer's attention to the suggested alternative content. It may also serve to keep viewers continuously interested and prevent viewers from abandoning the application. In addition, avoiding the suggestion of alternative content to viewers while they are absorbed in the currently displayed content, and synchronizing the presentation of alternative content with moments which are more convenient to the viewers, improves the service which is provided to the viewers and creates a more user-friendly environment.

According to certain embodiments the identification of peaks of high and low interest throughout the length of a specific video item is based on user generated events, which are generated by different users who watch the video. As explained in more details below, user generated events (or behavioral patterns) are recorded and analyzed in order to determine whether they indicate a change in the interest of the user in the video item.

Some of the user generated events may explicitly indicate a change in the viewer's interest in the currently watched video item. For example, one type of user behavioral event which can contribute to the analysis of the video item is the moment in time when viewers abandon a certain video item and switch to another video or to another webpage. A viewer may watch the full length of a video or he may stop watching a video item only a short time after it starts. Alternatively, a viewer may abandon the video at any time throughout the length of the video. This type of action (e.g. switching to a different video) may often identify the loss of interest in the previous video item.

Other user generated events are more implicit in this respect and their interpretation may change from one viewer to another and from one video to another. For example, the action of scrolling down a scroll bar, or hovering with the mouse over a webpage, may suggest that the active viewer is not interested in the currently presented video item and is therefore searching for alternative video content. Alternatively, some viewers may have a tendency to always scroll through the list of suggested content, regardless of their level of interest in the currently presented video item. Thus, often additional information is required in order to interpret such user generated events and deduce whether such actions indicate a change in respect of in the viewer's interest in the video item.

In accordance with certain embodiments, when analyzing user behavioral pattern, the method and system of the present inventions take into consideration the user-profile of the viewer who generated the event and the video profile of the viewed video item. The user profile and the video profile are utilizes for interpreting a user generated event and deducing whether the recorded user generated, event indicate a change in the interest of the user in respect of the presented content.

According to certain embodiments, data characterizing each video item of a given data-repository of video items (e.g., a data-repository of all video items available to given web site), is assembled and utilized for constructing a "video item profile" (or a video profile) for that video item. Also, data characterizing each user, who has watched at least one video item of the given video data-repository, is assembled and utilized for constructing a "user profile" for that user. According to certain embodiments, the data which is utilized for constructing a video profile of a specific video item comprises user generated events which were preformed by different users in respect of that specific video item, while user profile of a specific user is constructed based on the behavioral patterns of that user.

According to certain embodiments, additional information of a more descriptive nature in respect of users and video items is gathered. Such information includes, for example, metadata from relevant web pages, comments inserted by viewers and other descriptive information pertaining to video items and/or users. Metadata may include, for example, the duration of the video, textual data like title, tags and description, the presence or absence of certain keywords, for example, "funny" or "news" and other information which may indicate the nature or theme of the video item. Information of this kind may have an important contribution to the characterization and categorization of the video items and/or users. For example, the topic of the video is an obvious characteristic of a video item but it also characterizes a user as it may indicate preferences of the user who is watching the video. In another example, the length of the video item may help to interpret a user generated event. As short video items are more likely to be watched until the end, the abandoning of a short video item may serve as a stronger indication of loss of interest than the abandoning of a long video.

According to certain embodiments, additional information in respect of the viewers is also gathered. This may include, for example, previously visited websites, previously watched video items, analysis of comments written by a specific viewer, and key words used by a viewer during searches. Analyzing a user generated event based on a combination of information gathered from the user profile and the video profile may provide more accurate conclusions. For example, abandonment of a video, about basketball, (according to its video profile), by a viewer who, according to his profile, is fond of basketball is likely to be a stronger indication of an instance of loss of interest, than in a case where the same video item is abandoned by a user who is not fond of sports at all.

According to certain embodiments, the system and method of the present invention take into consideration the user profile, the video item profile, and additional information, and predicts one or more instances within the duration of the video during which a decrease in the interest of the viewer is most likely to occur and enables to utilize this information for synchronizing the presentation of alternative content with the predicted instances. Data which is necessary for the characterization of both the video items and the viewers is continuously being collected and stored. In general, the characterization of video items and viewers and the calculated level of interest, all of which are based on the collected data, become more accurate as more data is collected and becomes available.

It should be noted that the present invention is generally described, in relation to the detection of a decrease in the interest of the views, however, this is done only by way of example and the invention applies to other embodiments where other changes (such as an increase) in the level of the interest are required.

Attention is now drawn to FIG. 1 illustrating a generalized scheme of the system architecture 100 in a context of a network 120, in accordance with an embodiment of the invention. In order to synchronize the presentation of alternative content and/or advertisements with instances of decreasing interest of a viewer in the currently presented content, the system and method of the present invention assembles and analyzes information with regard to both the presented video items and the active viewers.

According to certain embodiments, system 100 includes at least one controller associated with the different modules and components of the system and configured to manage, execute and control the relevant operations.

According to certain embodiments, a data collection unit 105 is configured for collecting and receiving information by way of one or more clients 170 and from other data collection tools, such as web crawlers 175. Clients facilitate the interaction of viewers with the system 100. The data received by the data collection unit 105, through the client 170, includes, inter alia, behavioral patterns of the viewer, comprising a sequence of user generated events as performed by the viewer. As mentioned above, behavioral patterns can be used for creating both a video profile for each of the viewed video items and user profiles for the specific viewer who performed the user generated events. As further mentioned above, in order to improve the characterization of the viewer and enhance the user profile the data collection unit 105 may also obtain additional information characterizing the video item and the viewer, for example, the viewer's preferences and fields of interest.

In some embodiments, clients are configured to send to system 100 information with regard to user generated events, which are performed by a viewer, for example by a software running on client. In other embodiments, system 100 indirectly notices the events indicating a beginning, ending or stopping of a video view by keeping track of the requests for alternative content (which occur, e.g., at the beginning of the video) which may often signify that a viewer has moved from watching one video item to another.

Clients 170 may be, but are not limited to, personal computers, PDAs, cellular phones, portable computers, televisions, and the like. Each client 170 may include a display (e.g. screen) and a user interface and possibly an application for sending and receiving web pages, such as a browser application. According to certain embodiments, clients 170 can access one or more video data-repositories allowing users to select and watch a specific video item out of a plurality of available video items. As exemplified in FIG. 1, system 100 may be configured in the context of a network 120. The connection between the client 170 and system 100 may be realized over a network (e.g. the Internet), for example: a local area network (LAN), wide area network (WAN), metropolitan area network (MAN) or a combination thereof. The connection to the network may be realized through any suitable connection or communication unit. The connection may be implemented by hardwire or wireless communication means. Clients 170 may also be directly connected to the system via, for example, a universal serial bus (USB) connection.

Although system 100 is illustrated in FIG. 1 as if comprised in a single unit, this is not always necessary, and depending on the embodiment, modules in system 100 may be comprised in the same unit, may be connected over a network and/or may be connected through a direct connection.

According to certain embodiments, web crawlers 175 are facilitated for crawling through the video presenting application (e.g. website) in order to obtain video item related information such as video meta-data, comments on the video and other information from the website such as the hyperlink structure. The hyperlink structure and other internal structures of websites, such as the 'favorites' lists, may be used for identifying related video items and for the grouping of video items into clusters. Such association and clustering may be used for the construction of the video item profiles mentioned above (they may be also used for suggesting appropriate recommendations of video items at given contexts). For example, if there are several web pages which contain links to both video item $vi_1$ and video item $vi_2$, then these two video items are likely to be related, and would rather be grouped into the same cluster. Similarly, if several users mark both $vi_1$ and $vi_2$ as favorites, then $vi_1$ and $vi_2$ are likely to be similar in content, and would rather be grouped into the same cluster.

Web crawlers 105 are not limited to video content, but can also browse through websites, which are associated with the system of the present invention, in a methodical, automated manner and retrieve information regarding all video items which are associated with the websites. For example, websites may include lists of "favorite items" of viewers, discussions over the various items, friendship links between viewers, comments about video items, links from video items to contextually related items and more. All may provide, directly or indirectly, additional information about video items. Web crawlers may retrieve these pieces of information. Web crawlers 105 may also be used for retrieving additional data from other sources and websites in order to obtain more information and to better understand the meta-data which is associated with a certain video. For example, web crawlers 175 may be utilized to search, Wikipedia.org in order to retrieve definitions of terms which are found with in the meta-data associated with a video item.

Data may be obtained from a video presenting application while a user is either online or offline. An active viewer is a viewer who is currently engaged with a video presenting application, connected with system 100, it there follows that any data or interaction with an active viewer (via a client) is done online (e.g. through a client). On the other hand, data which is obtained by web crawlers 175 is independent of the user's interaction with the system. According to certain embodiments, the information collected by the data collection unit 105 is stored in a designated data-storage.

According to certain embodiments, the system comprises an interpretation unit 130 which is a processing unit and which comprises a pre-processing module 110, a video analysis module 115, a user segmentation module 125, and a consolidation module. According to certain embodiments a large amount of raw-data, which is collected by the data collection unit 105, the web crawlers 175 or any other data collecting tool which is known in the art and may be utilized by system 100, is subjected to initial processing by a pre-processing module 110. The raw data contains a large number of different types of information. Some of this information is actual high quality information while some of the information is low quality information or noise.

According to one embodiment, the pre-processing module 110 is a processing unit which is configured for filtering out noise. Noise filtering may include, for example, identifying and removing information generated by robots (i.e. computer programs which are aimed to automatically interface with websites), and checking for streaming problems or delays in the streaming, which may influence the results of the different calculations. For example, a delay in streaming may erroneously imply that a viewer has watched a video item for 60 seconds before switching to another item, while in fact the first 10 seconds were spent on buffering, due to delays in streaming. Such streaming problems are identified and their consequences are rectified by the pre-processing module 110. According to one embodiment, the pre-processing module is associated with a true time estimator (not shown) which is responsible for identifying and compensating for time delays resulting from streaming problems. Noise filtering may also include identifying and interpreting certain viewer actions that may confuse the system. For example, if a viewer pressed the pause button while watching a video item, the duration of time the pause button was pressed must be taken into consideration, when system 100 calculates what part of the video item was actually watched by the viewer.

In addition, in some embodiments, noise filtering may include selecting from the recorded user generated events only those events which are relevant for the analysis of the user behavioral pattern. For example in some cases and some configurations, there might be an indication that a recorded mouse-hover or a recorded mouse click or a sequence of such events occurred by mistake. In such scenarios the recorded user generated event should not be regarded as an indication of the viewer's level of interest in the video item. In another example, in some cases a video view which is too short should be ignored during data gathering and analysis.

According to certain embodiments, the pre-processing module 110 provides a first layer of user generated events interpretation. In this connection module 110 is configured for preliminary analysis of user generated events and creating additional "virtual" events (i.e. deduced user generated events) out of the "real" user generated events. For example, when a viewer is voluntarily requesting alternative content from the system, system 100 denotes this user generated event as a "request for alternative content" which is the explicit user generated event (i.e. a real event). System 100 may also denote this event as an event of "viewer lost interest in the displayed video" which is an event that represents an interpretation of the explicit event (i.e. virtual event). In another example, when a viewer watches a video item in slow motion this action is interpreted as "the viewer is intensely engaged in the displayed video" in addition to the explicit (real) event of "the user is watching the video in slow motion".

According to certain embodiments, information such as metadata collected in respect to a specific video item (or specific viewer) may also be subjected to preprocessing by pre-processing module 110. For example, web pages are parsed and the tags and their associated descriptive text are extracted.

According to certain embodiments, the data assembled in respect to each specific viewer is associated with the relevant viewer and stored in user profile data-repository 135 (e.g. database), and the data assembled in respect to each video item is associated with the relevant video item and stored in video profile data-repository 140 (e.g. database). It should be noted that although user profile database 135 and video profile database 140 are depicted as external components of system 100, being connected to system 100 via any known communication infrastructure, this is merely for the sake of example and databases may be located as internal components of system 100 as well. It should also be noted that although data-repositories 135 and 140 are depicted as separated components, in other examples they can be realized as a single repository unit.

According to certain embodiments, the video content related information is further processed by a video analysis module 115, which is another processing unit. The information which is received by this module 115 comprises video items with their associated data after it has been processed by the pre-processing module 110. According to certain embodiments, the data includes user generated events which were performed by viewers while watching the video items, virtual events which were generated by the pre-processing module 115 based on the user generated events, additional descriptive data pertaining to the video item and any other type of relevant information previously obtained by the data collection unit 105 or web crawlers 175.

According to certain embodiments, the video analysis module 115 is configured for further processing of the information associated with each specific video item. The video analysis module 115 is configured for characterizing a video item, for example, determining the theme of the video i.e. determining to which categories and sub-categories the video is related (e.g. category animals, sub-category pets, or category cars, sub-category sports cars), determining the length of the video, determining other characteristics of the video for example, whether the video is provocative, whether the video is funny, whether the video is of high quality, etc.

According to certain embodiments, the video analysis module 115 is also configured for the analysis of the real user generated event and the virtual user generated events. All user generated events are examined, and the implications of these events with regards to the interest of the viewer, in the video, is determined. According to some embodiments, user generated events are considered in view of the possible interpretations of the events, for example, whether the event itself implies an increase or decrease in the viewer's interest (e.g. was the user generated event a request for alternative content which explicitly implies that the viewer lost interest in the viewed video item). According to another embodiment, user generated events are considered also in view of the user profile belonging to the viewer who performed the event, for example, the user profile may indicate whether a certain user generated event is a typical behavior of the viewer usually associated with loss of interest. According to further embodiments, user generated events are further considered in view of the additional information which was gathered in respect of both the viewed video item and the viewer, for example, if the video item received poor reviews by previous viewers, a user generated event with questionable implication, should be interpreted as loss of interest in light of the general dislike expressed by user in respect of the video item. According to certain embodiments, the results of the video analysis module 115 may be facilitated for directing the web crawlers 175 for retrieving additional information from current websites or other information providing websites (e.g. Wikipedia) in order to better characterize the video item, as mentioned above.

According to certain embodiments, user generated events are analyzed and a score representing the inferred level of increase or decrease in the interest of the viewer which preceded the user generated event is calculated. The score is given to specific instances (or optionally time intervals) throughout the length of the video item, and indicates the inferred change in the interest of the user during these specific instances.

For example, in certain embodiments and in some configurations, it might be defined that a user generated event of a "Pause" operation is scored with 5 points, which signifies a 5 point increase in the interest of a viewer, while a user generated event of a "Scroll" operation is scored with 20 points which signifies a 20 points decrease in the interest of the viewer. The scoring may depend on properties of the video item (represented by the video profile) and the characteristics of the viewer (represented by a user profile). For example, if viewers of video items related to a certain theme tend to be perform many "Scroll" operations, then for video items of that specific theme, "Scroll" operations will get fewer points than for video items of other themes. Similarly, the scoring may be defined differently for different viewers. For example, a viewer who tends to perform many "Scroll" operations or a viewer who is younger than a predefined age may get fewer points for a scrolling operation compared to other users.

According to certain embodiments, the results obtained by the video analysis module 115 are stored in the video profile database 140 in association with the relevant video. Each time a video item is displayed to a viewer, the behavioral pattern of the viewer with respect to the video item is processed, analyzed and facilitated for identifying critical moments during which a change in the interest of the viewer has occurred.

Behavioral patterns of many users are analyzed, and repeating indications from different viewers, showing a change (e.g. a decrease) in the interest of viewers, which correspond to the same or to close instances or time intervals, within the duration of a specific video item, are identified. These identified instances may therefore serve to predict instances (or time intervals) during which other users are likely to experience a similar decrease in their interest. According to certain embodiment, the presentation of alternative content is synchronized with these instances or time intervals.

The identification of such critical moments is based on the viewing experience of as many viewers as possible, wherein the larger the number of times a video item is watched the more information (i.e. behavioral patterns) is available with regard to that video and the more reliable are the calculated results. Moreover, the greater the number of times a certain instance, in a certain video, was associated with a change (e.g. decrease) in the interest of different viewers, and the greater the number of such viewers, the higher is the statistical significance of the resulting indication.

For example, instances throughout the length of video item may be scored based on a number of parameters. The first being the number of indications (e.g. user generated events indicating loss of interest) which occurred during these instances and the second being the score which is assigned to each of the different types of user generated events. In addition as explained above the score may also be dependent on the user profile of the viewer who performed the action. All the above parameters are calculated to a final score. One or more instances with the highest score are determined as instances which are characterized by the highest probability for other (e.g. future) viewers to lose interest in the video item. In some embodiments, a single video item may include a plurality of critical instances representing high probability for a change (e.g. decrease) to occur in the interest of viewers, for example, a first instance during the first third of the video item, a second instance during the second third of the video item and third instance during the last third of the video item.

According to certain embodiments, the system also comprises a user segmentation module 125 which is a processing unit, configured, inter alia, for analyzing user generated events and creating a user profile for each specific user according to the behavioral pattern of the user (i.e. user generated events of the user). For example, the hovering and scrolling habits of a specific user, the tendency of the user to replay video items, and tendency of the user to watch movies until the end. According to certain embodiments, additional information gathered by the data collection unit 105 and pertaining to viewers' preferences and their fields of interest is also analyzed and used for characterization of the users. In addition, the user profile may be based on other properties of the user, like the user's geographical location or the explicit descriptive properties claimed by the user himself, such as hobbies, main interests and age. For each viewer a user profile is constructed according to the gathered information, and associated with the viewer, who is identified by a unique identifier, and stored in the user profile database 135. As previously explained, in some cases, while analyzing user generated events performed in respect to a certain video item, the video analysis module 115, may retrieve information (from the user profile database 135) pertaining to the viewer who performed the events in order to assist in the interpretation of the performed user actions. Optionally this may be limited to only a part of the users (e.g. to those users that have generated enough user events enabling system 100 to make a reliable statistical inference).

According to certain embodiments, system 100 is configured to use both the data stored in its databases and the data retrieved online from a viewer for providing a recommendation for appropriate instances for presenting advertisement and/or alternative content to the user. In order to select an appropriate moment for the presentation of alternative content, the system takes into consideration the information which was gathered with respect to the viewed video item together with the available information in respect of the current viewer. For example, if according to his user profile, a viewer who is currently watching a video item is a big fan of a certain basketball team, and he is currently watching a video showing that same basketball team, system 100 may choose to avoid presenting any alternative content, until the end of the video item, although the information stored in the video profile database 140, suggests that after 2 minutes a decrease in the interest of viewers in this specific video item is normally detected (assuming of course that the video item is longer than 2 minutes).

According to certain embodiments, and in order to accomplish this task, the system comprises a consolidation module 145, which is a processing unit, configured for combining information pertaining to each video item (i.e. video profile) together with the information pertaining to the current viewer (i.e. user profile), in accordance with a predefined set of rules. The consolidation module 145 generates a preliminary recommendation for the preferable time to present alternative content to the viewer.

For example, a viewer is categorized as "patient", if the viewer tends to watch video items till the end (e.g. if in more than 90% of the video views, the viewer has watched the video at least 90 percent of its length). For any given video item the system provides a recommendation as when to provide alternative content based on a statistical deduction from the behavioral patterns of all viewers. However, "patient" viewers may be provided with a different recommendation which is specifically adapted to their tendency to watch video items all the way through. In another example, say a "teenage viewer", if his age (according to descriptive properties claimed by the user, or alternatively, as inferred from his preferred content) is between 10 and 20. The system may provide "teenage" viewers with recommendations which are based on the statistical calculation which are made on the basis of behavioral patterns of "teenage" viewers only.

According to certain embodiments, the preliminary recommendation generated by the consolidation module 145 is transferred to a recommendation module 150. The recommendation module 150 is configured to issue a recommendation based on the information retrieved from the consolidation module 145 and additional information obtained from a policy constraints module 160. According to certain embodiments, the policy constraints module 160 maintains the policy and constraints provided by entities outside of the system logic such as the advertiser or the website owner. For example, an advertiser may want to limit the number of times an advertisement is presented to a viewer during one session. Therefore, although for example, a preliminary recommendation might be issued by the consolidation module 145 to present to a viewer alternative content at a certain moment, it would not be provided to the viewer after all, due to constraints set by the publisher.

According to certain embodiments, after all the relevant parameters are considered, the recommendation module 150 generates a recommendation which specifies a time (e.g. instance within the duration of the video) which is most appropriate for presenting alternative content to the viewer. Once a recommendation is generated, the recommendation module 150 synchronizes the presentation of alternative content in accordance with the generated recommendation.

According to one embodiment, the recommendation issued by the recommendation module 150 is sent directly to the client 170, providing the client with the information indicating when a recommendation for alternative content should be issued. The client is connected to some type of a resource or a system for providing the actual alternative content and utilized the recommendation provided by recommendation module 150 for timing the presentation of the content.

According to another embodiment, the recommendation is sent from the recommendation module 150 to another system or tool configured for recommending alternative content to the user 165. Such system can schedule the recommendation of alternative content which is sent to a client according to the recommendations provided by the recommendation module 150. An example for such a recommendation tool is the Applicant's propriety recommendation tool which is described in International Patent Publication Number WO 08/047,363, incorporated herein by reference. Thus, in some embodiments, system 100 may be configured as component within the Applicant's recommendation system and utilized for its enhancement.

In addition to the synchronization of the time of presentation of video items to time-interval which are recommended by system 100, the recommendation tool 165 may utilize the recommendations issued by system 100 for enhancing recommendation logic of recommendation tool 165. For example, recommendation tool 165 may consider adapting the presented alternative content to the recommendation issued by the recommendation module 150 (e.g. one type of content if the recommended time is close to the beginning of the video item and a different type of content if the recommended time is at the end of the video item).

The presentation of the alternative content can be realized by any means known in the art such as, for example, replacing the current video with an alternative one, presenting video content using pop-ups, covering a portion of the screen with the presented alternative content etc. The presented alternative content may include one or more video items or advertisements, which the user can choose from. Alternatively or additionally, the presented alternative content may include any combination of video items and advertisements being accessible to the user.

Figure 2:
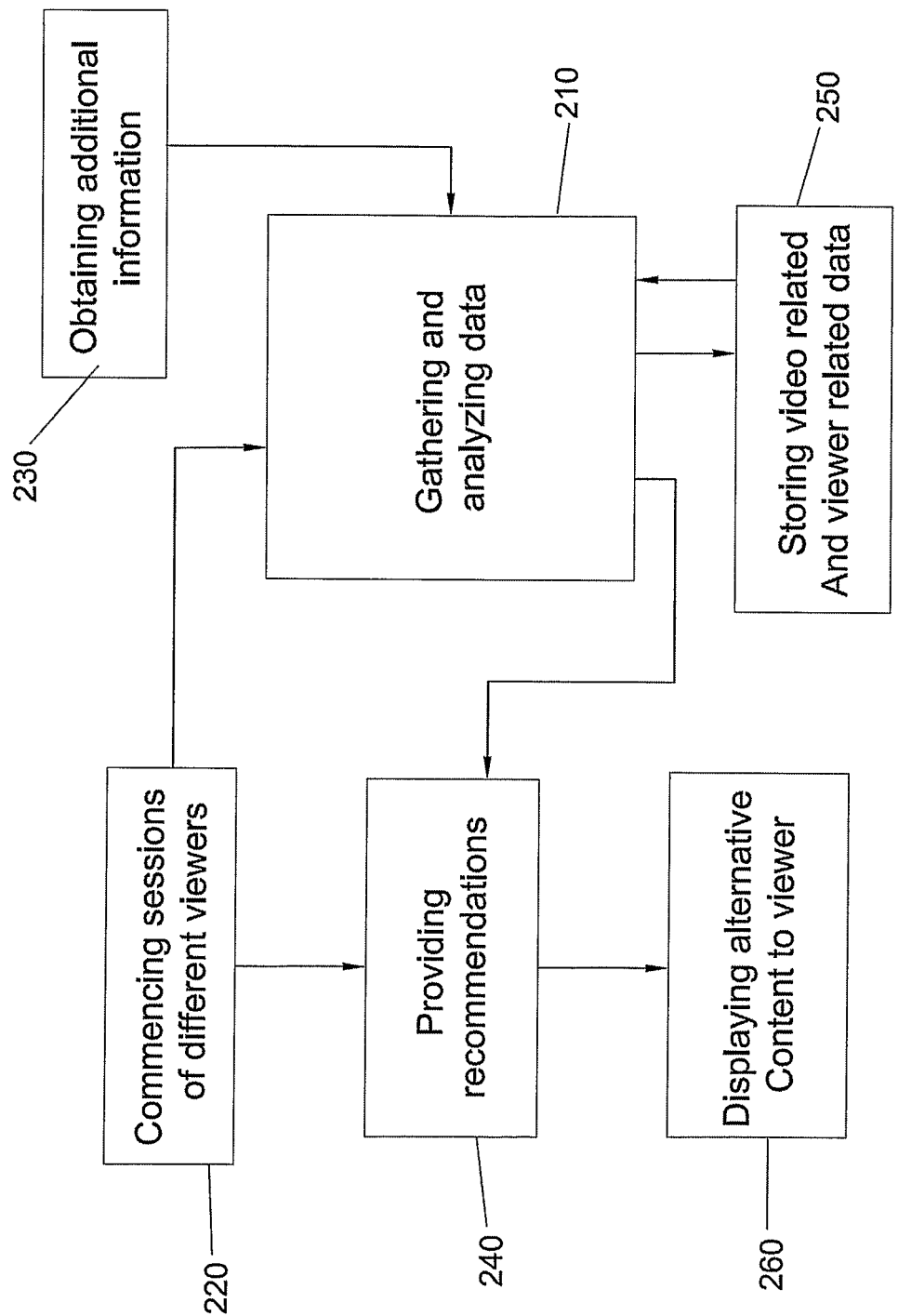
FIG. 2 illustrates a flowchart showing a high level view of the operations carried out, in accordance with an embodiment of the invention.

FIG. 2 is a flowchart showing a high level view of the operations carried out in accordance with an embodiment of the invention. In general system 100 performs two processes which are inherently connected. According to certain embodiments, in a first process the data pertaining to the currently viewed video item (video profile) and to the characteristics of the viewer (active user profile) is gathered and analyzed (stage 210) for the purpose of mapping throughout the length of the video item, instances during which a change is likely to occur in the interest of the viewers in the displayed video. According to certain embodiments, this process is performed continuously during the sessions of different viewers 220. The process also includes obtaining additional information which is related to different video items and different viewers 230 for example by facilitating web crawlers 175, as mentioned earlier. As explained above, stage 210 includes recording and interpreting user generated events in order to determine whether the recorded events imply that a change occurred in the interest of the user in the displayed video content, and in order to identify moments throughout the length of the video item during which such changes typically occur. The information which is obtained during the process illustrated in stage 210 is stored in the system databases 250.

According to certain embodiments, a second process, which may be performed in parallel to the first process, pertains to the provision of recommendations as to when to provide the current viewer with alternative content. This process is performed while a user is watching a video item. In order to provide this recommendation, the system takes into consideration the data regarding the currently viewed video item and data regarding the current viewer which was obtained earlier (during the first process mentioned above), and which is now stored in the system databases.

In addition, the system may also consider user-generated events which are being performed by the viewer in real-time during the current sessions 220 and provide an indication on changes in the viewer's interest in the currently presented video item. According to certain embodiments the system combines all the available data and provides a recommendation as to when to provide the current viewer with alternative content 240. The final resulting action may be the actual timing and display (e.g. on the client screen) of suggestions for alternative content according to the recommendation of the system 260.

Figure 3:
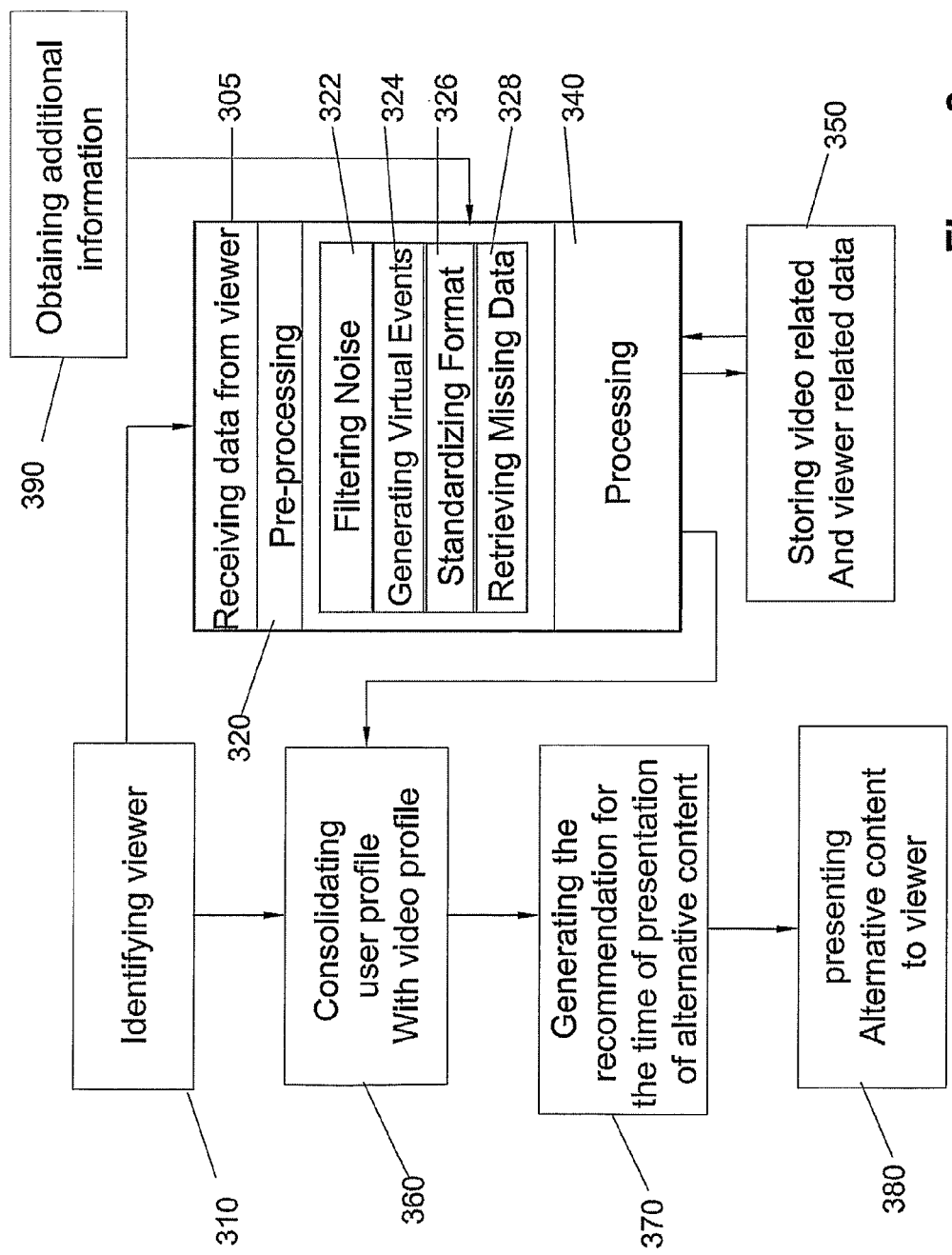
FIG. 3 illustrates a flowchart showing the operations of the system, in accordance with an embodiment of the invention.

FIG. 3 illustrates a flowchart showing the operations of the system, in accordance with an embodiment of the invention. According to certain embodiments, the system of the present invention is associated with any type of a video presenting application, for example a web browser operating a video displaying application or a V.O.D (view on demand) application on cable television. According to certain embodiments, the system first identifies that a viewer (or a plurality of viewers) is connected to the system and identifies the specific viewer 310. According to one embodiment, a viewer must be a registered user of the system and is identified by the system according to a designated ID number or name. According to another embodiment, the viewer does not have to register to the system and is recognized by other means, for example according to the current IP number. If the current viewer is not recognized, the system may suggest the viewer to become a registered user or alternatively automatically registers the current user. Once the current viewer is recognized, the system retrieves from the systems databases any information relating to the viewer, if available. According to certain embodiments, once system 100 recognizes that a viewer is connected it begins to record and process the user generated events (i.e. behavioral patterns) which are being generated by that viewer. This enables, inter alia, to enhance the user profile of the viewer and enables the system to make more accurate interpretations of the viewer's generated events in the future. If the current viewer is a new user of the system a user profile is created for the current user.

According to certain embodiments, in the next stage, user generated actions which are performed by one or more viewers which are connected to system 100 (i.e. current viewers) are recorded by the system 305 and undergo a preliminary processing stage (or preprocessing) 320. As explained above, preprocessing may include noise filtering 322, preliminary interpretation of the recorded events and the generation of virtual events 324.

According to certain embodiments, the system records the user generated events performed by the current viewers and checks whether a request for alternative content is made. For example, such requests may be sent by a client, in response to user starting a video view, as part of an automatic mechanism, defined within the website configuration, for requesting alternative content. Requests for alternative content are often scheduled to be issued at a predefined time at the beginning or during a video item and therefore, such requests may serve as a good indication that the user has started to watch a new video item. For that reason these requests are also very good indications that a previous video item has been abandoned by the viewer. In some embodiments, requests may also be issued as a result of a user action (e.g. pushing a button), providing a similar type of indication that the user has lost interest in the previous video item.

The request may be accompanied by relevant information such as the video item presently being viewed, the id of the user who has generated the request, the time stamp of the request, the type of user-interface element which caused it, etc. Depending on the behavioral pattern of the viewer, the user profile of the viewer and the website's configuration, the system decides whether a detected request for alternative content is likely to represent an indication that the viewer has begun to view a video item.

Websites may differ in the kind of user events which might take place, and in the availability of certain user generated events (some user generated events may be allowed only with association to specific events, for example, only after the video is ended), in some embodiments, these differences are taken into account during the analysis. For example, in some websites, a certain kind of request might appear at the beginning of the video view, while in other websites the same request may appear at the end of the video view. Thus, the same user generated event may be regarded as an indication that the viewer has begun to view a video item only in the former example and not in the latter.

The preprocessing stage 320 may also include a process of representing user generated events in a standardized format 326. The format of representation of user events may vary among different websites and applications, because in different situations there are different kinds of special user events, and in some cases there is some extra information attached to the user events (e.g., geographic location, comments, etc., which may be included for application-specific purposes). Therefore, standardization is necessary in order to enable the same analysis mechanism to handle data generated by all the different kinds of configurations and applications. In the standardized format, many different kinds of events will be represented as the same kind of event, if the distinctions between them are irrelevant to the analysis mechanism.

For example, suppose that according to the configuration of a first website, a single request for recommendations of alternative content is issued by the client in response to selection of a new video item by a viewer; while according to the configurations of a second website, two requests are issued by a client in response to the same user generated event (for example, because two recommendation lists are to be presented in different locations on the web page and request is issued for each list separately). System 100 is configured to interpret the single request in the first website and the double request in the second website in the same manner i.e. as a single indication that a viewer has started to watch a video item and abandoned the previous one. This example shows how different patterns of events from different websites are given the same interpretation.

According to some embodiments, the preprocessing stage, in stage 320, may also include the retrieval of missing information, for example, in some technologies (e.g., web pages), when a user views several videos in parallel, there might be inaccurate or missing information as to which user events refer to which video view; this missing information may be deduced by the pre-processing module by statistical methods. For example, as mentioned above, in certain website configurations, there may be multiple applications, for presenting alternative content, operating and displayed in parallel (e.g. one list of alternative video items may be presented at the side of the webpage and another list may be presented on the face of the video presenting application). Each of these applications may issue a (e.g. an automatic) request for alternative content at the same or very close time. Accordingly, if the system identifies two or more requests, issued by the same client, in respect of the same video item, in very close proximity, it may assume that both requests were made with respect to the same video item, since the time interval between the two events was too short for two different events to be generated.

According to certain embodiments, once an indication that a viewer is watching a video is recorded, (in stage 320) the system identifies which video item is currently being watched and associates the user generated events with the video item. If database 140 contains a record of the currently viewed video item the new information regarding this video is associated with the existing record. Otherwise, a new record is constructed for the video item and the information is associated with the new record. Each user generated event, (which passed the preprocessing stage) is associated with the relevant video item and the time within the length of the video, during which the user generated event has been recorded is saved (i.e. time stamp). Similarly, user generated events are associated and stored in the record of the current user in the user profile database 135.

In accordance with certain embodiments, during the next stage 340, the implication of the user generated events on the interest of the viewer in the video is determined. The system considers both real events and virtual events and decides whether these events indicated a change in the interest of the viewer in the video item. According to certain embodiments, the decision is made while taking into consideration the user profile of the viewer who performed the user generated events and additional data pertaining to the characteristics of the video. The additional data may be retrieved from off-line and on-line sources 390 as explained above with reference to FIG. 1.

The data concerning the user generated events and the video item is continuously gathered and analyzed throughout the interaction of the viewer with the system, and the analyzed information is stored in the system databases 350.

In order to provide a reliable prediction as to specific instances throughout the length of video item, during which it is likely for a change in the level of the interest of a viewer to occur, data concerning the user generated events pertaining to each specific video item should be gathered from as many viewers and views as possible. According to certain embodiments, the deduced indications pertaining to each video item are considered using statistical measures in order to weigh the reliability of the indications. Thus, in general, an indication showing a decrease in the viewer's interest in a specific instance within the duration of a specific video, which is repeatedly identified by the system in respect to many different viewers, provides a reliable indication. In addition, a reliable indication provides feedback to the system's logic with regard to the interpretation of the user generated events. For example, the interpretation of user generated events, which were generated within a certain time interval, as an indication of a decrease in the interest of users, is supported if after the interpretation has been made a large percentage of the users request alternative content within that time interval.

The stages depicted in FIG. 3, which were described thus far, constitute the first process as mentioned above with reference to FIG. 2. The remaining stages, which are described in FIG. 3, constitute a second process, which corresponds to the synchronization of a recommendation for alternative content, with a change in the interest of the current viewer in the displayed video.

According to certain embodiments, during stage 360 the data which is stored in the system databases (e.g. video profile database 140), during the current and previous sessions, in respect of instances throughout the duration of the video which are associated with a change in the interest of viewers in the displayed video are retrieved. In addition all the available information, in respect of the user profile of the current viewer, is also retrieved from the system databases (e.g. user profile database 135). According to certain embodiments, during this stage the characteristics of the user as deduced from user profile and the characteristics of the video as deduced from the video profile are weighed and are consolidated together to produce a recommendation. Accordingly, the system recommends whether and when to present alternative content to the viewer. For example, consider a case where a certain video item which is being watched by a viewer, is characterized by a substantial loss of interest around the beginning of the third minute of the video item. Typically the system would synchronize the presentation of alternative content with the recorded instance of loss of interest. However, in this example, the viewer has performed, after one minute, a user generated event which in accordance to his user profile indicates that he is losing interest in the currently displayed video, the system may provide a recommendation to present to the current viewer alternative content in synchronization with the user generated event and not wait for the recorded instance to arrive. If, however, this particular viewer does not show any indication that he is losing interest in the video and according to his user profile he almost always watches basketball related video items till the end, (assuming the current video item is related to basketball) the system may decide to recommend that no alternative content should be displayed to the current viewer during the current video.

According to certain embodiments, both the current user and the video item which is being watched by the current user may be unknown to the system. In this case, the recommendation as to when to provide alternative content to the user is done, according to predefined rules, which may be based for example, on statistical information which was gathered while taking into consideration general characteristics of previously, watched video items. For example, the correlation between the length of the video item and the time a decrease in the interest of viewers is typically observed can be calculated and utilized for generating a recommendation in such cases.

According to certain embodiments, if the currently watched video is known to the system while the viewer is a new viewer with no available user profile, the recommendation would be based on the video profile only. If the currently watched video is unknown to the system while the viewer is a known viewer (i.e. having an available user profile), the recommendation would be based on the user profile, possibly together with the general statistic pertaining to video items in general.

According to certain embodiments, in the next stage 370, additional limitation and conditions are taken into consideration as to whether to issue a recommendation and when. As specified above, these conditions may include, for example, certain constraints set forth by the publisher or the owner of the website. For example, a publisher may want to limit the number of times a recommendation is issued during one session. According to some embodiments, during this stage, recommendation system 165 is facilitated in order to select the most proper alternative content. The final output of this stage is a recommendation as to whether any alternative content should be displayed, when should it be displayed and, according to certain embodiments, also what should be displayed to the viewer. In the last stage 380, alternative content is presented to the current viewer in accordance with the recommendations which were issued in stage 370.

It should be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While various embodiments have been shown and described, it will be understood that there is no intent to limit the invention by such disclosure, but rather, it is intended to cover all modifications and alternate constructions falling within the scope of the invention, as defined in the appended claims.

The invention claimed is:

1. A computer implemented method of managing presentation of alternative content to be displayed on a display device during the presentation of a video item, said video item being presented by a video presenting application being configured to enable a plurality of viewers of said video item to generate user-generated events, the method comprising providing instruction to at least one processor to perform at least the following:
    monitoring video views of said video item by a plurality of viewers;
    recording, during said video views, user-generated events, said user-generated events being generated by the plurality of viewers of said video item, wherein the recording comprises, recording for each given user-generated-event, a respective time-stamp that is indicative of a time of occurrence of the given user-generated-event within the length of said video item;
    analyzing said user-generated events and determining a respective level of change in the interest of said plurality of viewers in said video item, inferred from the user-generated events, wherein the analyzing comprises:
    for at least one user-generated event, using a respective user profile of at least one viewer from said plurality of viewers who performed the at least one user-generated event, together with data in respect of the video item, for interpreting the at least one user-generated event and determining the respective level of change in the interest of the at least one viewer in said video item;
    generating, based on the time-stamps of the user-generated events, one or more time intervals throughout the length of said video item when said user-generated events occurred;
    generating a video profile, which is associated with said video item, with data indicative of one or more time intervals throughout the length of said video item that are characterized by a change in the interest of viewers in respect of said video item; and
    generating a recommendation to another computer system to synchronize the presentation of alternative content during a video view of said video item with a time selected based on its proximity to at least one of said one or more time intervals.

2. The method of claim 1, wherein the method is executed with the help of a system for analyzing video items comprising a data collection unit operatively coupled to a processing unit and a data repository, the method further comprising storing said video profile in said data repository.

3. The method of claim 1, wherein said video profile is generated based on statistical calculations.

4. The method of claim 1, wherein said analyzing step further comprises:
    creating virtual events which are based on said user-generated events and identifying virtual events indicative of a change in the interest of said one or more viewers in said video item.

5. The method of claim 1, wherein said change includes a decrease in the interest of said viewer in said video item.

6. The method of claim 1, wherein said user-generated events include one or more request for alternative content.

7. The method of claim 1 further comprising:
    presenting alternative content on a user display during a video view of said video item at a time that is synchronized to be in close proximity to a time interval that has been determined in said video profile that is associated with said video item to be characterized by a change in the interest of viewers in respect of said video item.

8. The method of claim 7, wherein said alternative content includes one or more other video items.

9. The method of claim 7, wherein said alternative content includes one or more advertisements.

10. The method of claim 7, wherein said alternative content includes a combination of one or more other video items with one or more advertisements.

11. A system of managing presentation of alternative content to be displayed on a display device during the presentation of a video item by a video presenting application adapted to enable a plurality of viewers of said video item to generate user-generated events, the system comprising:
    a processing unit configured to perform at least the following:
    monitoring video views of said video item by said plurality of viewers;
    recording, during each of said video views, user-generated events, being generated by said plurality of viewers of said video item, wherein the recording comprises:
    for each given user-generated-event, a respective time-stamp that is indicative of a time of occurrence of the given user-generated-event within the length of said video;
    analyzing said user-generated events and determining a respective level of change in the interest of said plurality viewers in said video item, inferred from the user-generated events, wherein the analyzing comprises:

for at least one user-generated event, using a respective user profile of at least one viewer from said plurality of viewers who performed the at least one user-generated event, together with data in respect of the video item, for interpreting the at least one user-generated event and determining the respective level of change in the interest of the at least one viewer in said video item;

generating, based on the time-stamps of the user-generated events, one or more time intervals throughout the length of said video item when said user-generated events occurred;

generating a video profile, which is associated with said video item, with data indicative of one or more time intervals throughout the length of said video item which are characterized by a change in the interest of viewers in respect of said video item; and generating a recommendation to another computer system to synchronize the presentation of alternative content during a video view of said video item with a time selected based on its proximity to at least one of said one or more time intervals.

12. The system of claim 11, further comprising at least one data repository, operatively connected to said processing unit, configured for storing said video profile.

13. The system of claim 11, wherein said processing unit is further configured for creating virtual events which are based on said user-generated events and to identify virtual events indicative of a change in the interest of said plurality viewers in said video item.

14. The system of claim 11, wherein said processing unit is further configured for receiving information indicative of one or more user-generated events, generated by a current viewer of said video item, and wherein said processing unit is further configured for generating and enhancing a user profile of said current viewer.

15. The system of claim 11, wherein said change includes a decrease in the interest of said viewer in said video item.

16. The system of claim 11, wherein said processing unit is configured to implement statistical calculations in order to generate said video profile.

17. The system of claim 11, wherein said user-generated events include one or more requests for alternative content.

18. The system of claim 11, wherein said processing unit is further configured to present alternative content to a user during a video view of said video item at a time selected based on its proximity to at least one of said one or more time intervals.

19. A non-transitory program storage device readable by machine, tangibly embodying a program of instructions executable by the machine to perform method steps of managing presentation of alternative content to be displayed on a display device during the presentation of a video item, said video item being presented by a video presenting application being configured to enable a plurality of viewers of said video item to generate user-generated events, the method comprising:

monitoring video views of said video item by a plurality of viewers;

recording, during each of said video views, user-generated events, generated by said plurality of viewers of said video item, wherein the recording comprises:

for each given user-generated-event, a respective time-stamp that is indicative of a time of occurrence of the given user-generated-event within the length of said video;

analyzing said user-generated events and determining a respective level of change in the interest of said plurality viewers in said video item, inferred from the user-generated events, wherein the analyzing comprises:

for at least one user-generated event, using a respective user profile of at least one viewer from said plurality of viewers who performed the at least one user-generated event, together with data in respect of the video item, for interpreting the at least one user-generated event and determining the respective level of change in the interest of the at least one viewer in said video item;

generating, based on the time-stamps of the user-generated events, one or more time intervals throughout the length of said video item when said user-generated events occurred; and generating a video profile, which is associated with said video item, with data indicative of one or more time intervals throughout the length of said video item which are characterized by a change in the interest of viewers in respect of said video item; and, generating a recommendation to another computer system to synchronize the presentation of alternative content during a video view of said video item with a time selected based on its proximity to at least one of said one or more time intervals.

20. A system for presenting alternative content to a current viewer of a video item, the system comprising:

a processing unit configured for utilizing at least a video profile that is associated with the video item comprising data indicative of one or more time intervals, throughout the length of said video item, which are characterized by a likelihood for a change to occur in the interest of said current viewer in said video item, and generating a instructions to synchronize the presentation of alternative content to said current viewer to a time selected based on its proximity to at least one of said one or more time intervals, wherein said video profile is one that has been generated by a system for analyzing a video item, the system being operative to receive one or more user-generated events obtained by a video presenting application adapted to enable a plurality of viewers of said video item to generate user-generated events, and comprising a processing unit configured to perform at least the following:

monitoring video views of said video items by said plurality of viewers;

recording, during each of said video views, user-generated events, being generated by said plurality of viewers of said video item, wherein the recording comprises:

for each given user-generated-event, a respective time-stamp that is indicative of a time of occurrence of the given user-generated-event within the length of said video;

analyzing said user-generated events determining a respective level of change in the interest of said plurality viewers in said video item, inferred from the user-generated events, wherein the analyzing comprises:

for at least one user-generated event, using a respective user profile of at least one viewer from said plurality of viewers who performed the at least one user-generated event, together with data in respect of the video item, for interpreting the at least one user-generated event and determining the respective level of change in the interest of the at least one viewer in said video item;

generating, based on the time-stamps of the user-generated events, one or more time intervals throughout the length of said video item when said user-generated events occurred;

generating said video profile, which is associated with said video item, with data indicative of one or more time intervals throughout the length of said video item which are characterized by a change in the interest of viewers in respect of said video item.

21. The system of claim 20, wherein said alternative content includes one or more other video items.

22. The system of claim 20, wherein said alternative content includes one or more advertisements.

23. The system of claim 20, wherein said alternative content includes a combination of one or more other video items with one or more advertisements.

24. A computer implemented method of presenting alternative content to a current viewer of a video item, the method comprising:

providing instruction to at least one processor for utilizing at least a video profile that is associated with the video item with data indicative of one or more time intervals throughout the length of said video item, which are characterized by a likelihood for a change to occur in the interest of said current viewer in said video item, and generating a recommendation to synchronize the presentation of alternative content to said current viewer to a time selected based on its proximity to at least one of said one or more time intervals, wherein the video profile is one that has been generated by:

monitoring video views of said video items by said plurality of viewers;

recording, during each of said video views, user-generated events, said user-generated events being generated by said plurality of viewers of said video item, the recording comprising: for each given user-generated-event, a respective time-stamp that is indicative of a time of occurrence of the given user-generated-event within the length of said video;

analyzing said user-generated events and determining a respective level of change in the interest of said plurality viewers in said video item, inferred from the user-generated events, wherein the analyzing comprises:

for at least one user-generated event, using a respective user profile of at least one viewer from said plurality of viewers who performed the at least one user-generated event, together with data in respect of the video item, for interpreting the at least one user-generated event and determining the respective level of change in the interest of the at least one viewer in said video item;

generating, based on the time-stamps of the user-generated events, one or more time intervals throughout the length of said video item, when said user-generated events occurred;

generating said video profile, which is associated with said video item, having data indicative of one or more time intervals throughout the length of said video item which are characterized by a likelihood for a change to occur in the interest of viewers in respect of said video item.

25. The method of claim 24, further comprising:

receiving information indicative of one or more user-generated events generated by said current viewer, and generating and enhancing a user profile of said current user, wherein said step of providing instruction and generating a recommendation further utilizes said user profile of said current user.

\* \* \* \* \*